United States Patent [19]
Boudreau

[11] 3,955,828
[45] May 11, 1976

[54] BICYCLE HANDLEBAR ASSEMBLY

[75] Inventor: Robert J. Boudreau, Bedford, Pa.

[73] Assignee: Hedstrom Co., Bedford, Pa.

[22] Filed: Jan. 6, 1975

[21] Appl. No.: 538,760

[52] U.S. Cl.............................. 280/279; 403/104; 403/362
[51] Int. Cl.².......................................... B62K 21/22
[58] Field of Search.................. 280/279, 278, 280; 403/104, 362, 109, 383; 248/413

[56] References Cited
UNITED STATES PATENTS

| | | | |
|---|---|---|---|
| 564,741 | 7/1896 | Dunn | 403/362 |
| 1,378,838 | 5/1921 | Crane | 403/377 |
| 2,253,857 | 8/1941 | Hedstrom | 280/279 UX |
| 2,859,979 | 11/1958 | Himes | 280/279 |

FOREIGN PATENTS OR APPLICATIONS

| | | | |
|---|---|---|---|
| 677,685 | 12/1929 | France | 403/377 |

Primary Examiner—Andrew V. Kundrat
Attorney, Agent, or Firm—Cesari & McKenna

[57] ABSTRACT

An improved handlebar assembly able to withstand a standard rotational torque test comprises a front fork whose tubular stem has an interior flat area which mates with an exterior flat area on a tubular handlebar post slidably received in the fork stem so that the two members are fixed rotatively, but are free to slide axially to adjust the height of the handlebars. The height adjustment is set by a special tubular collar which slidably engages over the top of the fork post. A set screw threaded into the side of the collar extends through an opening in the wall of the fork stem and bears against the handlebar post, thereby pressing the two flat areas together.

2 Claims, 3 Drawing Figures

U.S. Patent    May 11, 1976    3,955,828
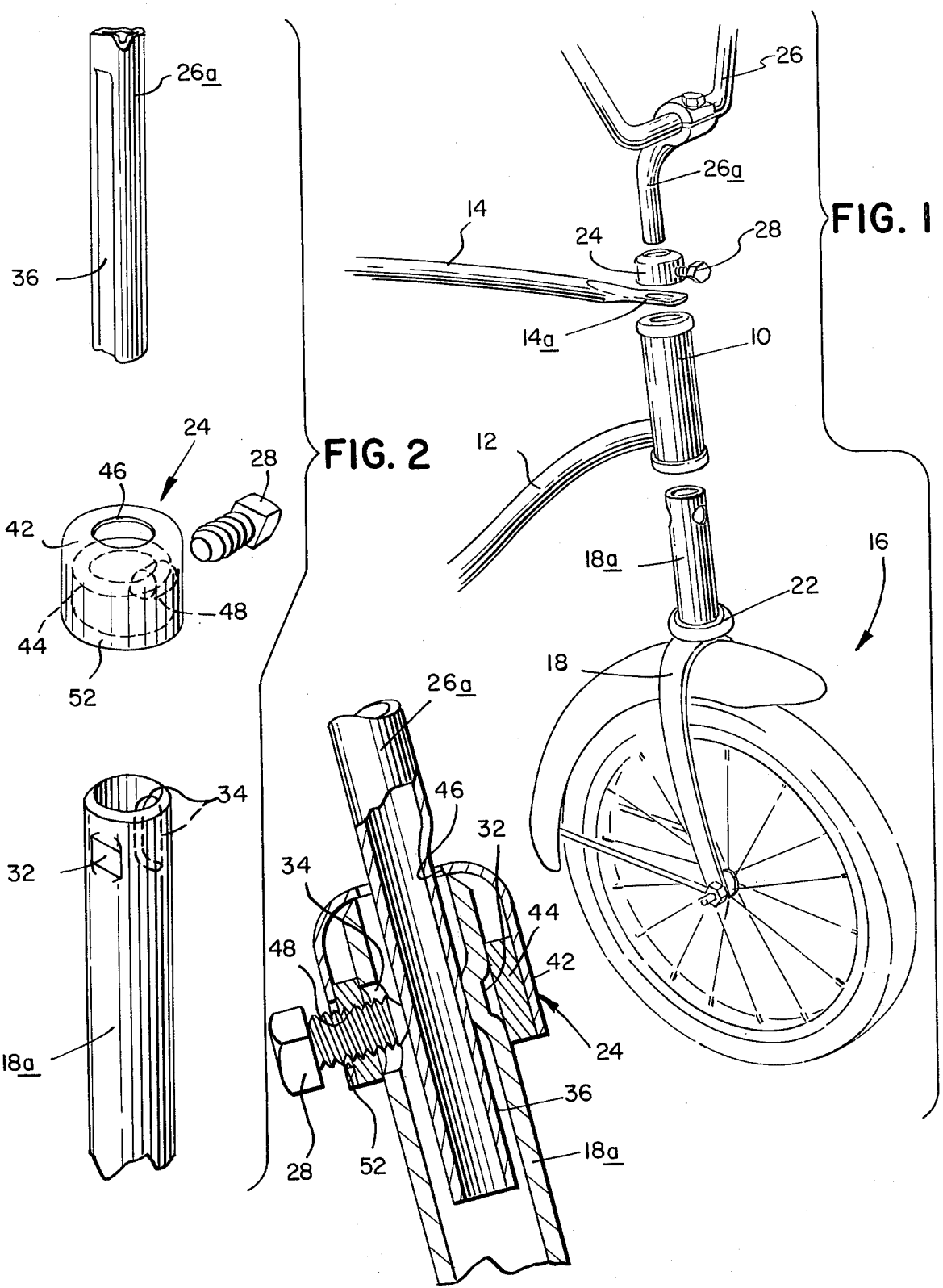

BICYCLE HANDLEBAR ASSEMBLY

BACKGROUND OF THE INVENTION

This invention relates to an improved handlebar assembly for bicycles. It relates more particularly to a rugged, safe handlebar assembly which is especially suited for use on relatively low-cost sidewalk bikes, as opposed to the more elaborate multispeed variety. While we refer specifically to bicycles throughout this application, it should be understood that the invention described herein is equally applicable for use on tricycles.

The recently enacted government safety regulations covering children's bicycles require that the bicycle handlebar assembly pass a rotational torque test of at least 35 lbs. This means that with the front fork held in a fixed position, a torque on the handlebars of 35 lbs. must not cause the handlebars to turn relative to the front fork.

Some difficulty has been encountered in satisfying this regulation without unduly increasing the overall cost of the bike. Some obvious solutions require the use of relatively expensive machined parts. Others necessitate the use of parts which must be spot-welded or otherwise held in place prior to assembling the bike, thereby increasing labor costs. Still other solutions make it more difficult to assemble the front end of the bike. Bearing in mind that most bicycles of this type are shipped to the customer in a knocked-down condition and must be assembled by the parent in the home without any special tools or equipment, it is imperative that the construction be such that the bikes can be put together by an unskilled person with a minimum amount of time and effort.

SUMMARY OF THE INVENTION

Accordingly, the present invention aims to provide an improved handlebar assembly for a bike which satisfies the rotational torque requirements set by the United States Government.

A further object of the invention is to provide a bicycle handlebar assembly which employs a minimum number of low-cost, stamped, tubular and sheet metal parts and thus does not materially add to the overall cost of the bike.

A further object of the invention is to provide a bicycle handlebar assembly which can be put together quickly by an unskilled person without any special tools.

Yet another object of the invention is to provide a handlebar assembly of this type which allows a wide range of adjustment of handlebar height without sacrificing rotational torque strength.

In general, my handlebar assembly employs a front fork whose tubular stem is provided with an internal flat area. The fork stem extends up through the bicycle head tube assembly in the usual way. The handlebars include a tubular post having an exterior flat area extending an appreciable distance along the post. When the two flat areas are aligned, the fork stem slidably receives the handlebar post with the two areas preventing relative rotation between those two members.

The handlebars are retained at a selected height above the fork by a collar engaging over the top of the fork stem projecting through the head tube assembly. A set screw inserted into the side of the collar projects through an opening in the fork stem opposite the flat area thereon. When the screw is turned down, it bears against the handlebar post and presses the two flat areas together, preventing rotational as well as axial movement of the handlebar relative to the fork.

All of the components of the handlebar assembly, including the collar, consist of standard, low-cost, stamped and tubular metal parts. The only machining involved is the formation of the threaded opening in the collar to receive a standard machine screw. Accordingly, even though the handlebar assembly has exceptionally high rotational torque strength, the overall cost of the bike is not increased materially as compared with other prior assemblies not having this advantage. Furthermore, the assembly is easy to install initially and adjust later if need be.

BRIEF DESCRIPTION OF THE DRAWING

For a fuller understanding of the nature and objects of the invention, reference should be had to the following detailed description taken in connection with the accompanying drawing, in which:

FIG. 1 is a fragmentary exploded perspective view of a sidewalk bicycle having a handlebar assembly made in accordance with the present invention;

FIG. 2 is an exploded fragmentary perspective view showing the elements of the assembly in greater detail; and FIG. 3 is a fragmentary view with parts cut away illustrating the position of the various components of the assembly in actual use.

DESCRIPTION OF THE PREFERRED EMBODIMENT

Referring now to FIG. 1 of the drawing, the assembly includes a conventional head tube assembly 10. The usual lower reach bar 12 and upper reach bar 14 extend rearwardly from the head tube. The head tube is arranged to rotatively receive a front wheel assembly shown generally at 16 which includes a front fork 18 having a fork stem 18a extending up through the head tube so that its upper end projects through the top of the tube.

A plastic washer 22 slid onto the stem 18a provides a bearing surface at the lower end of the head tube assembly. The fork stem 18a projects through an opening 14a in the flattened end of the upper reach bar which functions as the upper bearing surface, thereby retaining the upper reach bar in place on the head tube assembly.

Handlebars 26 have a tubular post 26a which is slidably received in the fork stem 18a. Then the handlebar post 26a and fork stem 18a are secured together by a machine screw 28 threaded into the collar and bearing against the handlebar post 26a inside the fork stem 18a, as will be described presently. Prior to installation of the handlebars 26, a collar 24 is engaged over the end of the fork stem 18a projecting above the head tube assembly.

All of the components of the handlebar assembly are conventional except for fork stem 18a, the handlebar post 26a and the collar 24. Therefore, only these three members will be dealt with in detail.

Referring now to FIG. 2, the fork stem 18a is tubular and is struck near its upper end to form an internal flat area 32. Also, an opening 34 is formed in stem 18a directly opposite area 32.

The handlebar post 26a is also struck to form a flat area 36 which extends an appreciable distance along the length of the post. The flat areas 32 and 36 are so positioned on their respective members that when the wheel assembly 16 and handlebar 26 are properly aligned, the flat areas 32 and 36 are opposite one another.

As best seen in FIGS. 2 and 3, collar 24 comprises a generally cylindrical exterior shell 42 and an internal circular ring 44 formed of relatively heavy bar stock press-fit into shell 42. The lower end of shell 42 is fully open and the inside diameter of ring 44 is slightly larger than the outside diameter of stem 18a so that the collar 42 can be slid over the end of the stem 18a projecting up through head tube 10. The upper end of shell 42 is formed with a reduced diameter opening 46 which is slightly larger in diameter than the outside diameter of the handlebar post 26a, thereby permitting that post to be slid down into stem 18a.

A threaded passage 48 is formed in ring 44. A coextensive opening 52 is provided in shell 42 to accommodate the set screw 28. In use, the collar 24 is engaged over the projecting end of the stem 18a and oriented relative thereto so that screw 28 is positioned opposite opening 34 in the stem. Then the handlebar post 26a is slid down through opening 46 and aligned so that its flat area 36 is positioned opposite flat area 32 on the fork stem as shown in FIG. 3. This alignment permits further downward travel of the handlebar post, yet prevents relative rotation between the post and stem.

When the handlebar 26 is positioned at the correct height above the head tube assembly 10 for the child, screw 28 is turned down into the threaded passage 48 until its inner end bears against handlebar post 26a inside ring 44. Further tightening of the screw tightly presses the flat area 36 on post 26a against the opposing area 32 on stem 18a so that those two numbers are securely retained against relative rotational or axial movement.

Even when the wheel assembly 16 is trapped in a relatively deep crack or rut during normal use of the bike, the rider can turn the handlebars 26 to escape and the torque will be transmitted to the wheel assembly without any rotational slippage between the handlebars and the wheel assembly. In actual tests, the assembly is able to withstand a relative rotational torque between the handlebar and wheel assembly of as much as 35 lbs. without any relative rotational movement between those two members.

Aside from the set screw 28 which is an off-the-shelf item, made in extremely high volume and thus at low cost, and the threaded passage 48 in ring 44, the assembly involves no machining of parts. Rather, only conventional stamping and forming techniques are required to make the various components of the assembly. Accordingly, the cost is kept to a minimum. Furthermore, the handlebar assembly is composed of a minimum number of discrete parts which must be assembled by the user so that the chances of parts becoming lost are minimized. Also the time and effort required to assemble the components are kept to a minimum.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. An improved handlebar assembly comprising a head tube, a front fork having a tubular stem slidably and rotatively received in the head tube with its upper end projecting from the top of the head tube, means defining a flat area on the inner wall of the stem near its upper end, a tubular upper reach bar having its forward end engaged over the projecting end of the stem, a collar slidably engaged over the projecting end of the stem above the reach bar and for retaining said bar and on said stem, a tubular handlebar post, means defining a flattened area on the handlebar post extending an appreciable distance along the length of the post, said post being slidably received in the collar and tubular stem when the flat areas on the post and stem are in opposition, said flattened areas preventing relative rotation between the post and stem, an opening in the stem opposite the flattened area therein and a set screw threaded into the collar which, when turned down, projects through the opening in the stem and engages the post therein, securing it at a selected axial position relative to the stem.

2. The assembly defined in claim 1 wherein the collar comprises a generally cylindrical shell having a reduced diameter opening in one end for slidably receiving the handlebar post and a relatively thick ring snugly fitted in the shell, the inside diameter of the ring being sized to slidably receive the front fork stem, means defining an opening in the side wall of the shell, and means defining a threaded opening in the ring positioned directly opposite the side wall opening in the shell for threadedly receiving the set screw.

* * * * *